US012657843B2

(12) United States Patent
Charlton et al.

(10) Patent No.: US 12,657,843 B2
(45) Date of Patent: Jun. 16, 2026

(54) SYSTEM AND METHOD FOR AUGMENTED REALITY BROADCAST INTEGRATION

(71) Applicant: Snap Inc., Santa Monica, CA (US)

(72) Inventors: Ebony James Charlton, London (GB); Maxwell Goedjen, Los Angeles, CA (US); Micah D. Jackson, Los Angeles, CA (US); Benjamin Lo, Los Angeles, CA (US); Arash Pessian, Topanga, CA (US); Christopher Cavins, Santa Clarita, CA (US)

(73) Assignee: Snap Inc., Santa Monica, CA (US)

( * ) Notice: Subject to any disclaimer, the term of this patent is extended or adjusted under 35 U.S.C. 154(b) by 137 days.

(21) Appl. No.: 18/439,491

(22) Filed: Feb. 12, 2024

(65) Prior Publication Data

US 2025/0078413 A1　Mar. 6, 2025

Related U.S. Application Data

(60) Provisional application No. 63/580,841, filed on Sep. 6, 2023.

(51) Int. Cl.
*G06T 19/00* (2011.01)
*H04N 21/2187* (2011.01)
*H04N 21/431* (2011.01)

(52) U.S. Cl.
CPC ....... *G06T 19/006* (2013.01); *H04N 21/2187* (2013.01); *H04N 21/4312* (2013.01)

(58) Field of Classification Search
CPC .............. G06T 19/006; H04N 21/2187; H04N 21/4312
See application file for complete search history.

(56) References Cited

U.S. PATENT DOCUMENTS

2021/0352262 A1　11/2021　Buslaev et al.
2021/0389996 A1　12/2021　Charlton et al.
(Continued)

FOREIGN PATENT DOCUMENTS

CN　　115175005　　　10/2022
CN　　115175005　A　* 10/2022　........... H04N 21/816
WO　　2025054457　　　3/2025

OTHER PUBLICATIONS

"International Application Serial No. PCT US2024 045596, International Search Report mailed Nov. 20, 2024", 4 pgs.
(Continued)

*Primary Examiner* — Yingchun He
(74) *Attorney, Agent, or Firm* — Schwegman Lundberg & Woessner, P.A.

(57) ABSTRACT

A method and system for augmenting live video feeds with augmented reality (AR) effects. A live video feed comprising a plurality of video frames is received and the format of the video frames is determined. The video frames are converted to a format compatible with an AR software development kit (SDK). One or more AR effects from the AR SDK are applied to the converted frames. This can include detecting depictions of objects in the frames and applying effects to the detected objects. The effects can be selected based on detected object types. The frames are then re-converted back to the original format. If the frame rate differs between the video feed and AR SDK, frame rate conversion is performed before and after applying the AR effects. The augmented video frames including the AR effects are provided as output, such as for broadcast or display.

14 Claims, 9 Drawing Sheets

(56)     References Cited

U.S. PATENT DOCUMENTS

2022/0279234 A1     9/2022  Qiu
2025/0071368 A1*    2/2025  Lee .................. H04N 21/44008

OTHER PUBLICATIONS

"International Application Serial No. PCT US2024 045596, Written
Opinion mailed Nov. 20, 2024", 4 pgs.

* cited by examiner

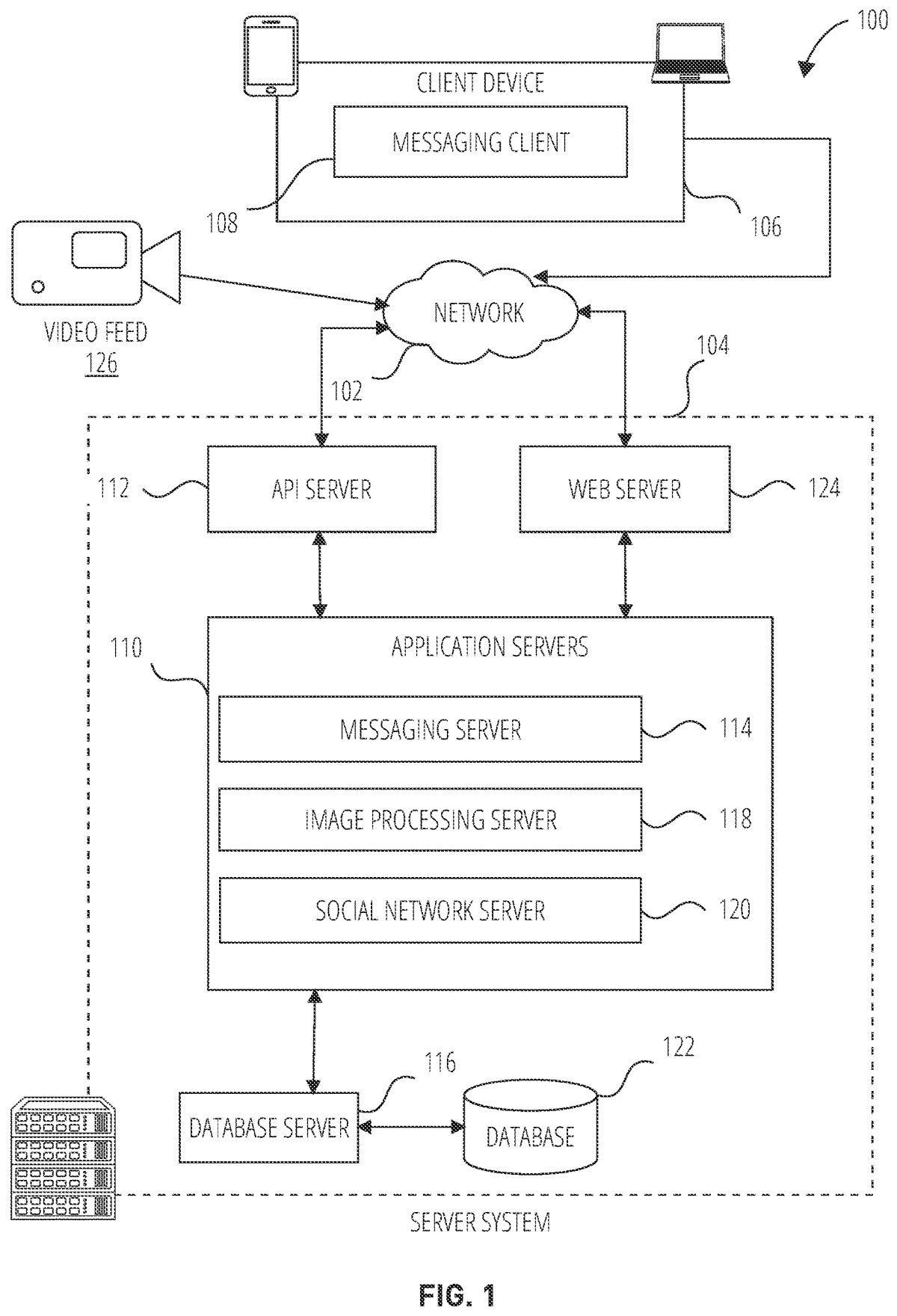

CLIENT DEVICE

MESSAGING CLIENT

108

106

100

VIDEO FEED
126

NETWORK

102

104

112    API SERVER

WEB SERVER    124

110    APPLICATION SERVERS

MESSAGING SERVER    114

IMAGE PROCESSING SERVER    118

SOCIAL NETWORK SERVER    120

116    DATABASE SERVER    DATABASE    122

SERVER SYSTEM

FIG. 1

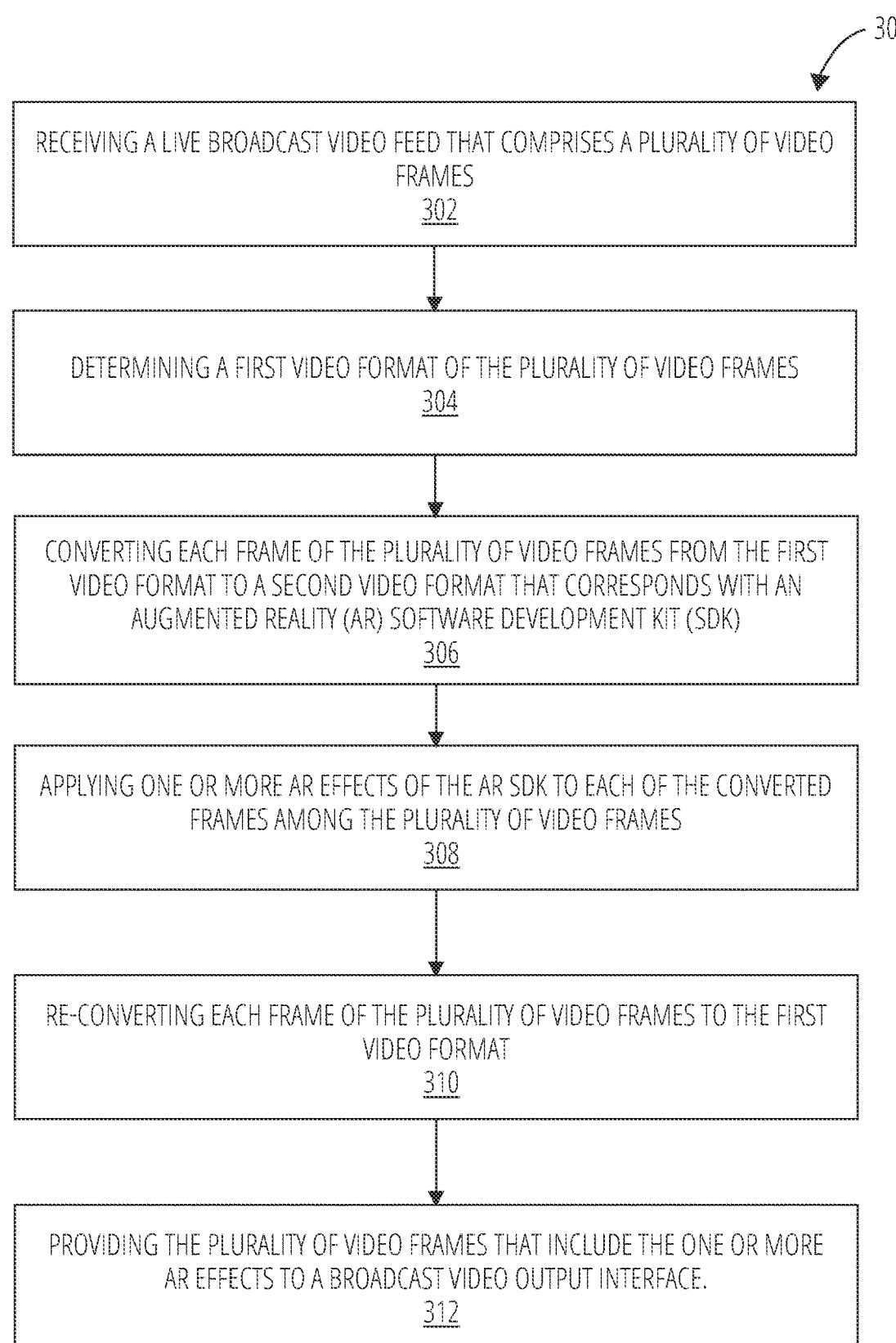

RECEIVING A LIVE BROADCAST VIDEO FEED THAT COMPRISES A PLURALITY OF VIDEO FRAMES
302

DETERMINING A FIRST VIDEO FORMAT OF THE PLURALITY OF VIDEO FRAMES
304

CONVERTING EACH FRAME OF THE PLURALITY OF VIDEO FRAMES FROM THE FIRST VIDEO FORMAT TO A SECOND VIDEO FORMAT THAT CORRESPONDS WITH AN AUGMENTED REALITY (AR) SOFTWARE DEVELOPMENT KIT (SDK)
306

APPLYING ONE OR MORE AR EFFECTS OF THE AR SDK TO EACH OF THE CONVERTED FRAMES AMONG THE PLURALITY OF VIDEO FRAMES
308

RE-CONVERTING EACH FRAME OF THE PLURALITY OF VIDEO FRAMES TO THE FIRST VIDEO FORMAT
310

PROVIDING THE PLURALITY OF VIDEO FRAMES THAT INCLUDE THE ONE OR MORE AR EFFECTS TO A BROADCAST VIDEO OUTPUT INTERFACE.
312

FIG. 3

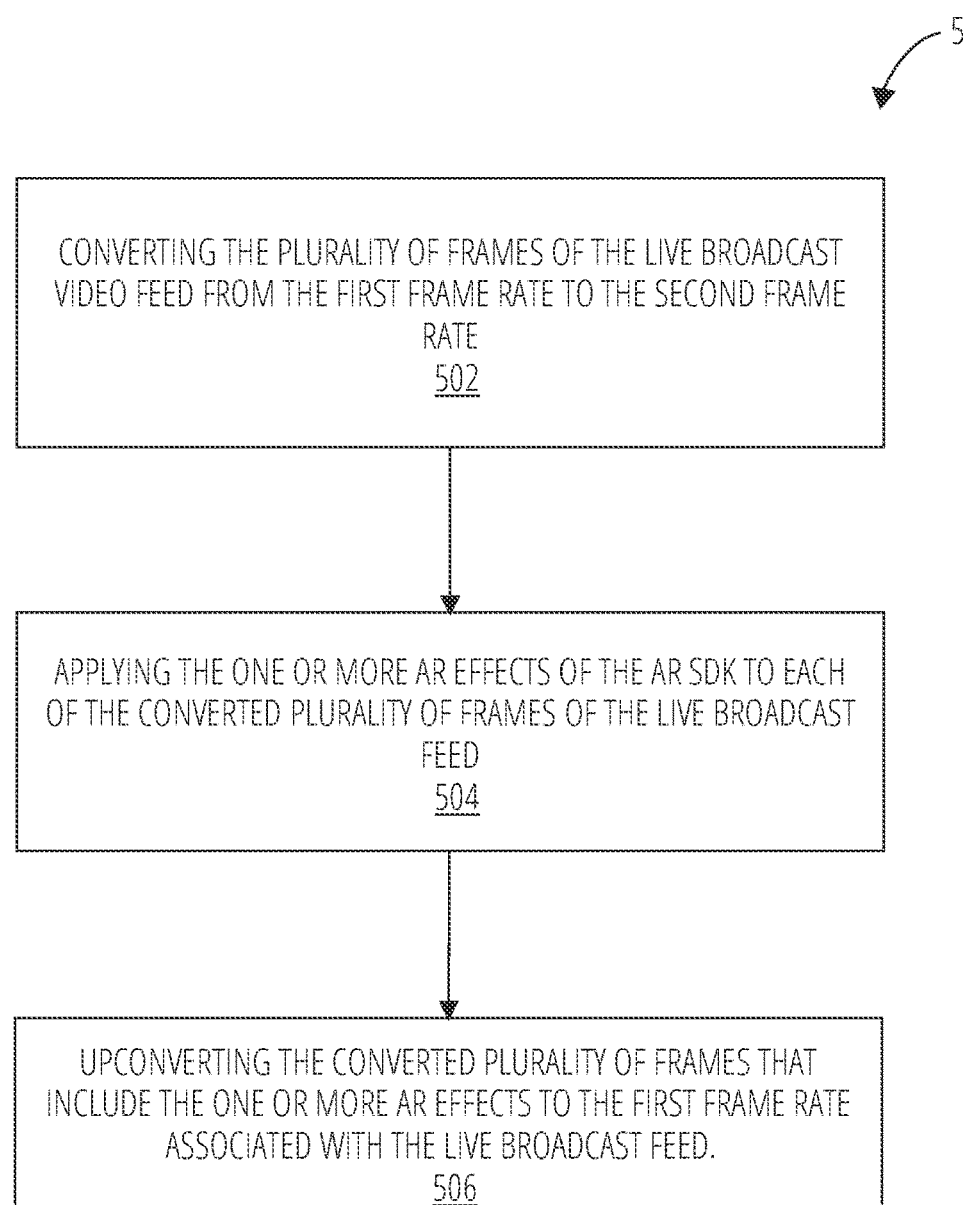

CONVERTING THE PLURALITY OF FRAMES OF THE LIVE BROADCAST VIDEO FEED FROM THE FIRST FRAME RATE TO THE SECOND FRAME RATE
502

APPLYING THE ONE OR MORE AR EFFECTS OF THE AR SDK TO EACH OF THE CONVERTED PLURALITY OF FRAMES OF THE LIVE BROADCAST FEED
504

UPCONVERTING THE CONVERTED PLURALITY OF FRAMES THAT INCLUDE THE ONE OR MORE AR EFFECTS TO THE FIRST FRAME RATE ASSOCIATED WITH THE LIVE BROADCAST FEED.
506

FIG. 5

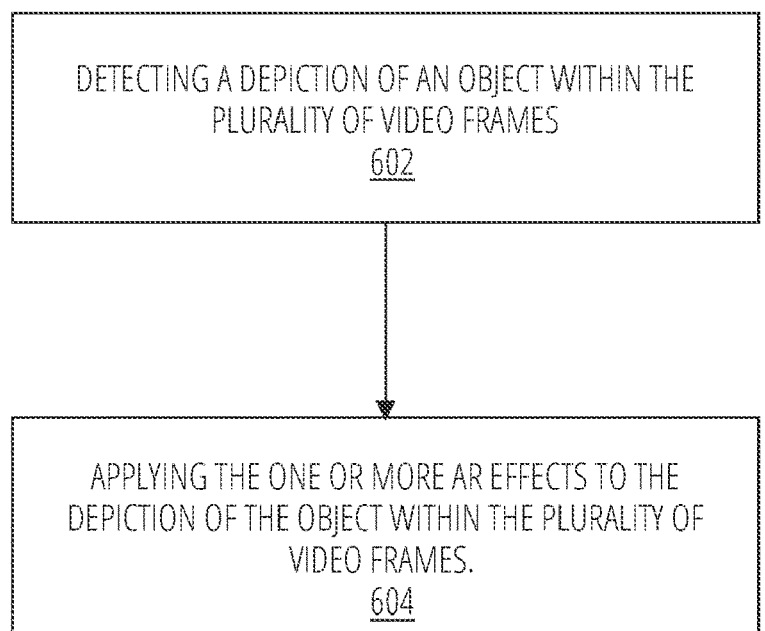
DETECTING A DEPICTION OF AN OBJECT WITHIN THE PLURALITY OF VIDEO FRAMES
602
APPLYING THE ONE OR MORE AR EFFECTS TO THE DEPICTION OF THE OBJECT WITHIN THE PLURALITY OF VIDEO FRAMES.
604
FIG. 6

SYSTEM AND METHOD FOR AUGMENTED REALITY BROADCAST INTEGRATION

CROSS-REFERENCE TO RELATED APPLICATION

This patent application claims the benefit of U.S. Provisional Patent Application No. 63/580,841, filed Sep. 6, 2023, entitled "SYSTEM AND METHOD FOR AUGMENTED REALITY BROADCAST INTEGRATION", which is incorporated by reference herein in its entirety.

BACKGROUND

Augmented reality (AR) technology has become more prevalent with the widespread adoption of smartphones and mobile devices. Many software applications now provide AR experiences by applying graphical overlays and effects to a user's real-time environment as captured by the device's camera.

While AR applications have become common on mobile platforms, integration into live broadcast video feeds poses additional challenges. AR effects are typically designed to run at lower resolutions and frame rates suitable for mobile devices. However, broadcast standards require much higher resolutions of 1080p or 4K at high frame rates around 60 fps.

Applying AR effects to live video streams requires specialized video processing capabilities. The video feed must be converted into a format usable by AR software development kits (SDKs). After applying AR effects, the video needs conversion back to broadcast standards. High performance and low latency is critical for live video.

Existing AR solutions are not designed for broadcast workflows. The user interfaces tend to be tailored for mobile use cases rather than professional operators. This makes it difficult to smoothly integrate AR effects into live events and productions.

Therefore, there is a need for a system capable of applying AR effects to live broadcasts at scale. The system must handle video format conversion and optimization for AR SDKs. It also requires custom interfaces for broadcast operators to preview and control AR effects in real-time during a live event.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 1 is a diagrammatic representation of a networked environment in which the present disclosure may be deployed, in accordance with some examples.

FIG. 3 is a flowchart depicting a method for suggesting one or more user groups to include in a response to a message, in accordance with one embodiment.

FIG. 5 illustrates an aspect of the subject matter in accordance with one embodiment.

FIG. 6 illustrates an aspect of the subject matter in accordance with one embodiment.

DETAILED DESCRIPTION

Figure 2:
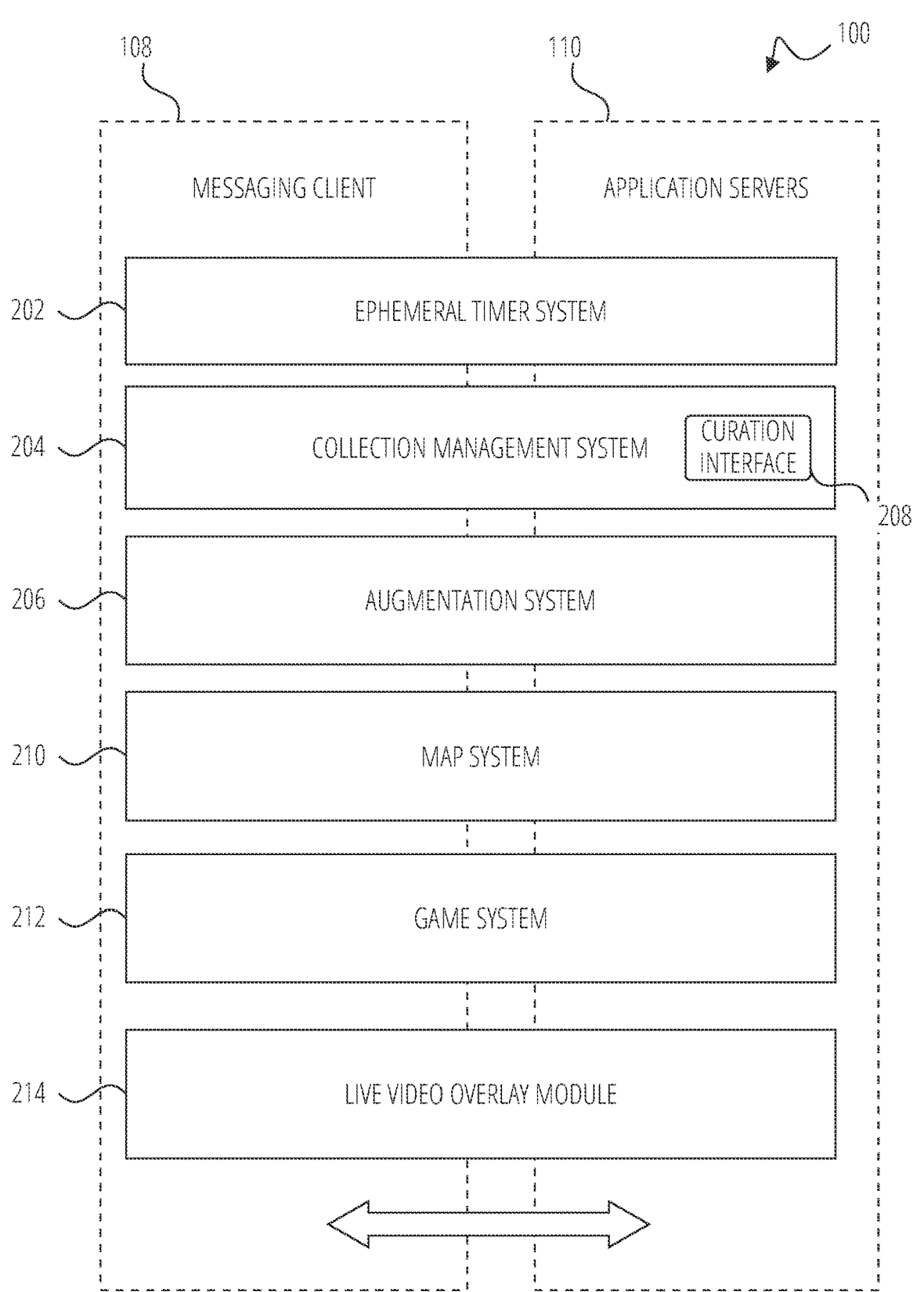
FIG. 2 is a diagrammatic representation of a messaging system, in accordance with some examples, that has both client-side and server-side functionality.

Augmented reality (AR) technology has seen rapid adoption in recent years for mobile applications and devices as smartphones have become ubiquitous and able to integrate real-time computer vision and graphics. However, adoption in live broadcast video workflows has been more limited to date. Integrating compelling AR effects into live feeds poses a number of challenges including real-time processing constraints, format incompatibilities, and lack of customization for broadcast operators. Most current methods rely on offline post-processing which prevents practical usage for live events. Some existing networked solutions fail to meet end-to-end latency requirements or lack tailoring for broadcaster's specific needs. The present disclosure solves these issues with a system architecture specialized for augmenting broadcasts with interactive AR overlays generated in real-time.

According to certain example embodiments, the present disclosure describes a system with multiple interconnected modules for augmenting live broadcast video feeds with AR effects. This includes a video translation module responsible for format conversion between the live video feed domain and AR SDK domain, an AR effects module that applies effects using computer vision techniques and an AR software development kit, and a broadcast integration module that re-converts the video out to broadcast standards and outputs the augmented feed. The system can be implemented via software executing on general-purpose hardware, dedicated video processing hardware, or a combination thereof.

The disclosed techniques provide a system to handle format conversion between the live video feed and AR SDK domains. Object detection further allows AR effects to be applied selectively based on the scene content. The system is controllable through an intuitive user interface tailored for live broadcast scenarios. The techniques can enhance live events, broadcasts, and productions with interactive AR overlays customized in real time.

According to certain example embodiments, the present disclosure describes a system and method for augmenting live broadcast video feeds with AR effects from a mobile SDK in a computationally efficient manner. The system receives a live broadcast video feed meeting broadcast standards. For example, the video feed may be received from sources like video cameras, production switchers, servers, or other live video processing systems. Example formats include resolutions of 1080p or 4K and frame rates of 60 fps to match broadcast quality standards. The system determines parameters of the input video feed like resolution, frame rate, and color space, and converts the feed into a format compatible with and AR SDK. For example, the system may:

Downscale resolution from 4K to 1080p

Convert frame rate from 60 fps to 30 fps

Transform color space from YCbCr to sRGB

Accordingly, the system applies one or more AR effects to the converted frames. This may involve detecting objects like faces and overlaying virtual graphics or effects on the objects. For example, the system applies one or more AR effects to the converted frames. The system may detect objects like faces using techniques like facial recognition. It augments the detected objects with virtual overlays mapped to physical surfaces and environments.

For example, the system could overlay:

Virtual glasses, masks, hats on detected faces

Animated 3D models on detected bodies

Graphical textures on detected architectural surfaces

An AR effect selection interface may be presented at a client device to preview and select effects to apply to the live video feed. After the system applies the AR effects to the frames, the system re-converts the frames back to the original broadcast video format.

In some embodiments, The system determines key parameters of the live video feed such as resolution, frame rate, and color space/pixel format to appropriately configure conversion processes. For example, the system can auto-detect an incoming 1080i 59.94 Hz Y'CbCr feed or a 720p 60 Hz RGB feed by analyzing headers and signal characteristics. The system can also detect parameters based on manual user configuration of expected video formats. By automatically supporting a wide range of common broadcast formats like interlaced and progressive scan signals in SD, HD, and UHD 4K, the system can flexibly interface with diverse broadcast equipment.

The system adapts its conversion process based on the detected format to translate the live video into a domain compatible with the AR SDK. For instance, if the feed is 1080p 60 fps YCbCr, the module would downscale to 720p 30 fps RGB for the AR effects module. In some embodiments, the system interfaces with various broadcast video feed sources through internationally standardized serial digital interface (SDI) connections, allowing interoperation with professional cameras, switchers, and infrastructure. The system can also intake other common interfaces like HDMI, DVI, and IP-based NDI feeds. This flexibility allows the AR augmentation system to be integrated at various points within a broadcast production workflow. The system can intake feeds from primary cameras, switcher program outputs, video servers, or other video routing hardware. The system auto-negotiates input parameters to simplify configuration.

This allows the system to interface with different types of live broadcast equipment and workflows without manual configuration. The video translation module automatically handles conversion into and out of the AR SDK domain based on the input video characteristics.

In some embodiments, the system may determine the video format based on inputs received from a client device. For example, a user could manually specify parameters like resolution, frame rate, and color space through a settings interface. The module would use these provided settings to configure the appropriate conversion processes. This allows the system to integrate with a diverse range of video feeds without needing automatic format detection. The user simply enters the feed specifications, and the module handles the appropriate domain translation.

In some embodiments, the system may apply one or more AR effects to depictions of objects detected within the live video feed. For example, the system may detect faces of people in the crowd at a live event using facial recognition techniques. Object detection is performed on the converted video frames using techniques such as Haar cascades, histogram of oriented gradients (HOG), and deep convolutional neural networks. In some embodiments, the system may utilize a YOLO (You Only Look Once) model for real-time object detection. The module would then augment the detected faces with virtual overlays like glasses, masks, hats, etc. Other object detection techniques could identify bodies, architectural surfaces, logos, text, and other on-screen elements to overlay AR effects onto.

This allows AR effects to be applied selectively based on the content of the live video feed. Rather than generic overlays, the augmentations can react dynamically to the captured scenes and camera perspectives.

In some embodiments, the system may provide a selection of AR effects based on objects detected within the video feed. For example, responsive to detecting a depiction of a face within the live video feed, the system may present AR effects to be applied to faces, and a user could choose a face mask effect through the AR selection interface. In some embodiments, the system provides an interactive AR effects control interface to broadcast operators, enabling previewing, selection, and real-time manipulation of effects applied to the live feeds. The interface displays thumbnails of available virtual objects, overlays, 3D models, and filters that can be mapped onto detected scene elements. Multiple effects can be layered, customized, and animated in real-time while previewing the output before taking to air. Looks can be dynamically updated and saved for re-use in other broadcasts. This gives broadcasters intuitive control over AR augmentations comparable to familiar video switchers and mixers.

Similarly, in some embodiments selecting an AR effect may cause the system to detect corresponding objects within the video feed. For example, selection of a virtual hat effect would trigger face detection, while selecting a pet effect would activate animal recognition. The desired AR effect guides the object recognition techniques applied. For instance, selecting a pet effect triggers animal classifiers to detect pets in the video frames to which virtual accessories can be mapped. The effects transform and follow the contours of the detected objects.

Networked Computing Environment

FIG. 1 is a block diagram showing an example system 100 for exchanging data (e.g., video data, messages, and associated content) over a network. The system 100 includes multiple instances of a client device 106, each of which hosts a number of applications, including a messaging client 108, as well as a video feed 126. Each messaging client 108 is communicatively coupled to other instances of the messaging client 108 and a server system 104 via a network 102 (e.g., the internet).

A messaging client 108 is able to communicate and exchange data with another messaging client 108 and with the server system 104 via the network 102. The data exchanged between messaging client 108, and between a messaging client 108 and the server system 104, includes functions (e.g., commands to invoke functions) as well as payload data (e.g., text, audio, video or other multimedia data).

The server system 104 provides server-side functionality via the network 102 to a particular messaging client 108. While certain functions of the system 100 are described herein as being performed by either a messaging client 108 or by the server system 104, the location of certain functionality either within the messaging client 108 or the server system 104 may be a design choice. For example, it may be technically preferable to initially deploy certain technology and functionality within the server system 104 but to later migrate this technology and functionality to the messaging client 108 where a client device 106 has sufficient processing capacity.

The server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the system 100 are invoked and controlled through functions available via user interfaces (UIs) of the messaging client 108.

Turning now specifically to the server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a Social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The Social network server 120 supports various social networking functions and services and makes these functions and services available to the messaging server 114. Examples of functions and services supported by the Social network server 120 include the identification of other users of the system 100 with which a particular user has relationships or is "following," and also the identification of other entities and interests of a particular user.

System Architecture

FIG. 2 is a block diagram illustrating further details regarding the system 100, according to some examples. Specifically, the system 100 is shown to comprise the messaging client 108 and the application servers 110. The system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a live video overlay module 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the system 100 from a specific geographic location may be displayed within the context of a map at that particular location to "friends" of a specific user on a map interface of the messaging client 108. A user can furthermore share his or her location and status information (e.g., using an appropriate status avatar) with other users of the system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the system 100. The system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The live video overlay module 214 provide format conversion between the live video feed received from the video feed 126 and AR SDK domains. Object detection further allows AR effects to be applied selectively based on the scene content. The system is controllable through an intuitive user interface tailored for live broadcast scenarios. The live video overlay module 214 enables live augmentation of broadcast video feeds with AR effects in a robust and efficient manner.

FIG. 3 is a flowchart illustrating operations of a live video overlay module 214 in performing a method 300 for augmenting a live video feed with AR effects, in accordance with one embodiment. Operations of the method 300 may be performed by one or more subsystems of the system 100 described above with respect to FIG. 2, such as the live video overlay module 214. As shown in FIG. 3, the method 300 includes one or more operations 302, 304, 306, 308, 310, and 312.

At operation 302, the system receives a live broadcast video feed that comprises a plurality of video frames from the video feed 126. The live video feed comprises multiple video frames. The video feed could come from various sources, such as a live sports broadcast, a video game stream, or a live event.

At operation 304, the system determines a first video format of the plurality of video frames of the live video feed. For example, the system may analyze the incoming video feed to determine the format of the video frames. The format could be determined by examining the encoded video data and metadata, or based on inputs received from the client device 106.

At operation 306, the system converts each frame to a second video format that is compatible with an AR SDK that will be used to apply effects. For example, the AR SDK may require a specific format, such as a raw uncompressed format. The frames would need to be converted to this format using known techniques, such as OpenCV pixel format conversion functions. This allows the AR SDK to analyze and modify the frame pixels.

At operation 308, the system applies one or more AR effects to the converted frames. For example, in some embodiments the system may detect objects, mapping environments, overlaying virtual objects, etc. In order to present AR effects. As an illustrative example, the system may detect a person's face and overlay virtual sunglasses and hats. Or it could add a virtual fish tank into a room.

At operation 310, the system re-converts the frames back to the first video format of the video feed 126. This is done so that the modified frames with effects can be integrated back into the original live video feed properly.

At operation 312, the system provides the modified frames that include the AR effects to a video output. This could be saving them to a video file, streaming them to a website, displaying them in an app, etc.

Figure 4:
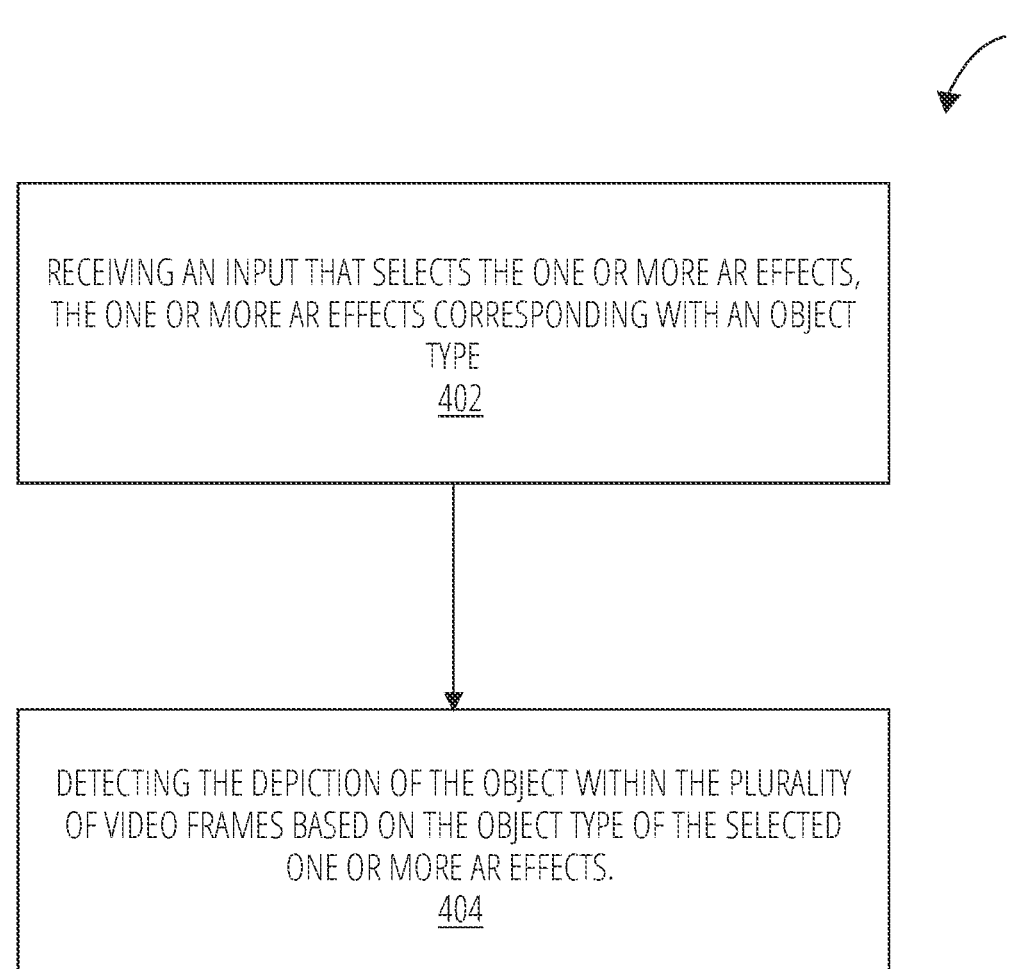
FIG. 4 illustrates an aspect of the subject matter in accordance with one embodiment.

FIG. 4 is a flowchart illustrating operations of a live video overlay module 214 in performing a method 400 for augmenting a live video feed with AR effects, in accordance with one embodiment. Operations of the method 400 may be performed by one or more subsystems of the system 100 described above with respect to FIG. 2, such as the live video overlay module 214. As shown in FIG. 4, the method 400 includes one or more operations 402 and 404.

At operation 402, the system receives an input that selects one or more AR effects that correspond to a particular object type from within an interface presented at a client device 106. For example, the user could select a "dog" effect or a "car" effect from a menu. This indicates that AR effects related to dogs or cars should be applied to the video.

At operation 404, the system detects depictions of the desired object type within the live video feed frames received from the video feed 126. This would utilize computer vision techniques to scan the video frames for the selected object type from within the ocnverted video frames of the video feed 126. For example, a dog object detector would be used to identify dogs in the frames if the "dog" AR effect was selected.

Various object detection algorithms can be used for this, such as Haar cascades, HOG, deep learning networks, etc. The desired object detector would be activated based on the type of effect selected in operation 402. The object detection generates regions of interest within the frames where the selected object type is depicted.

Once the regions of interest are identified, as discussed in operation 306 of the method 300, the system can then apply the corresponding AR effects onto those regions. For example, virtual dog accessories could be overlaid onto the detected dogs. The effects are customized based on the selected object type.

FIG. 5 is a flowchart illustrating operations of a live video overlay module 214 in performing a method 500 for augmenting a live video feed with AR effects, in accordance with one embodiment. Operations of the method 500 may be performed by one or more subsystems of the system 100 described above with respect to FIG. 2, such as the live video overlay module 214. As shown in FIG. 5, the method 500 includes one or more operations 502, 504, and 506.

At operation 502, the system converts the live video feed frames received from the video feed 126 from their original frame rate to the frame rate required by the AR SDK. Live video can have various frame rates like 24, 30, 60 fps, while the AR SDK may require a specific rate. Frame doubling, tripling, or merging smooths mismatches between disparate domains.

The frame rate conversion uses interpolation techniques to generate new frames. This matches the feed to the AR SDK's frame rate. Motion-compensated interpolation predicts missing frames by analyzing pixel motion vectors. This maintains fluidity and avoids choppiness when upconverting or downconverting. The matched rate provides optimal SDK performance.

At operation 504, the matched frame rate allows the AR SDK to smoothly apply effects without dropped or repeated frames. Virtual graphics translate realistically across scenes without jittering.

At operation 506, the system then converts the frame rate back to the original live feed rate. The augmented frames with effects are upconverted or downconverted to match the initial video of the video feed 126.

This allows the AR effects to be added at the optimal frame rate for the SDK, while retaining the original frame rate of the live feed. The frame rate conversions ensure a smooth integration of the effects back into the live video.

FIG. 6 is a flowchart illustrating operations of a live video overlay module 214 in performing a method 600 for augmenting a live video feed with AR effects, in accordance with one embodiment. Operations of the method 600 may be performed by one or more subsystems of the system 100 described above with respect to FIG. 2, such as the live video overlay module 214. As shown in FIG. 6, the method 600 includes one or more operations 602, and 604.

At operation 602, the system detects depictions of objects like people, vehicles, animals, text, and architectural structures within the live video feed frames using convolutional neural networks. The networks analyze pixel patterns to recognize visual features and semantics associated with different object classes based on deep learning techniques. Object detection generates regions of interest corresponding to the detected items along with classification labels.

The system scans each incoming video frame and leverages an optimized detection model to identify object locations in real-time. The model localizes objects bounding boxes with associated labels (e.g. person, car, pet), tracking multiple classes across scenes with little latency. This provides the regions where effects can be mapped.

At operation 604, the system renders the selected AR effects onto the detected objects, tracking the graphics to the objects' locations and contours. Virtual overlays are mapped to real surfaces for an immersive experience. For example, as depicted people or objects move around, the hat (or other) effect translates and rotates to remain affixed to their heads or other tracked point in a realistic manner.

The integration of computer vision-based tracking and interactive AR overlays allows realistic, dynamic effects synchronized to live action. Broadcast viewers experience enhanced immersion responsive to captured content.

Machine Architecture

Figure 7:
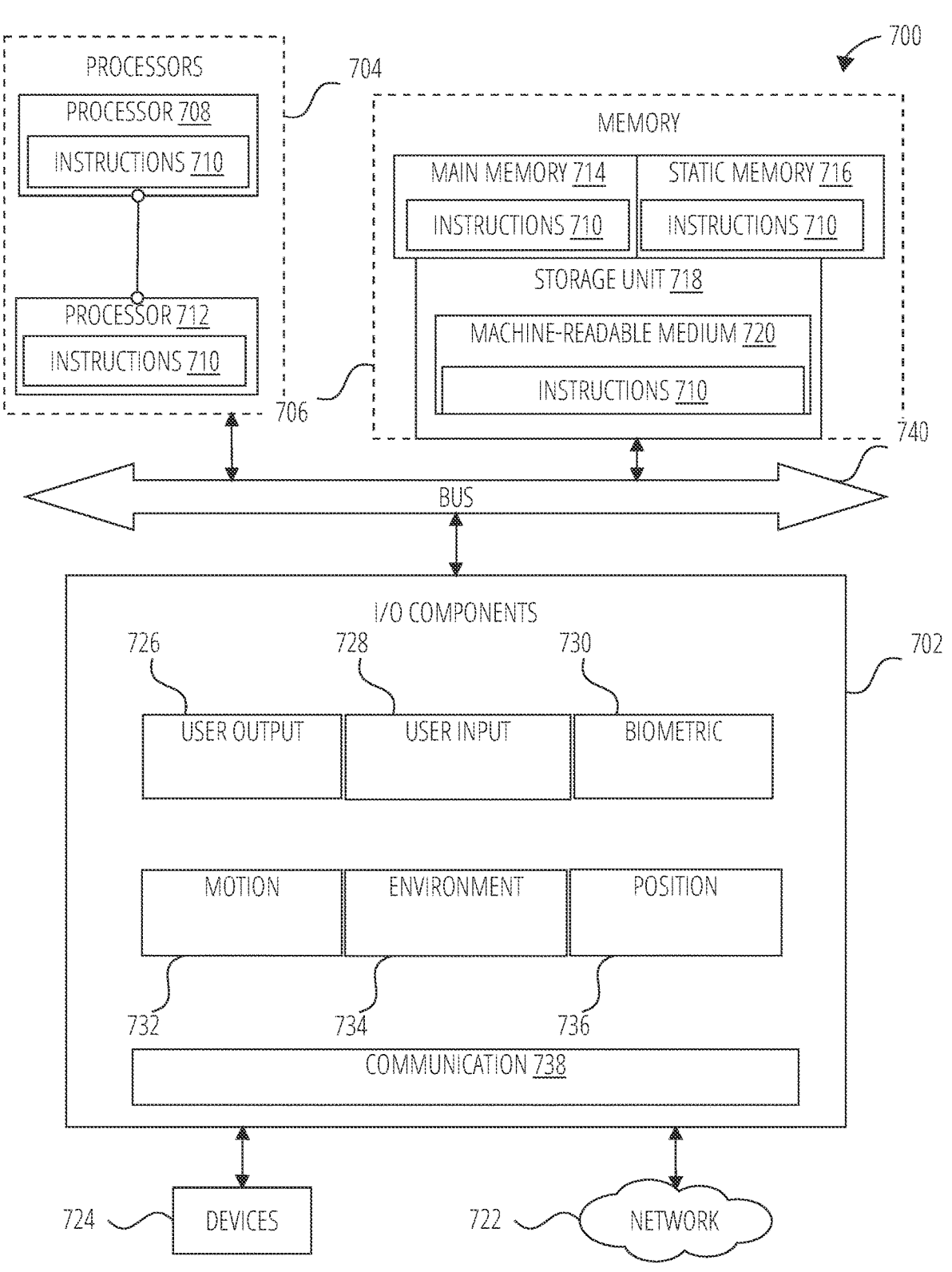
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the client device 106 or any one of a number of server devices forming part of the server system 104. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 638, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
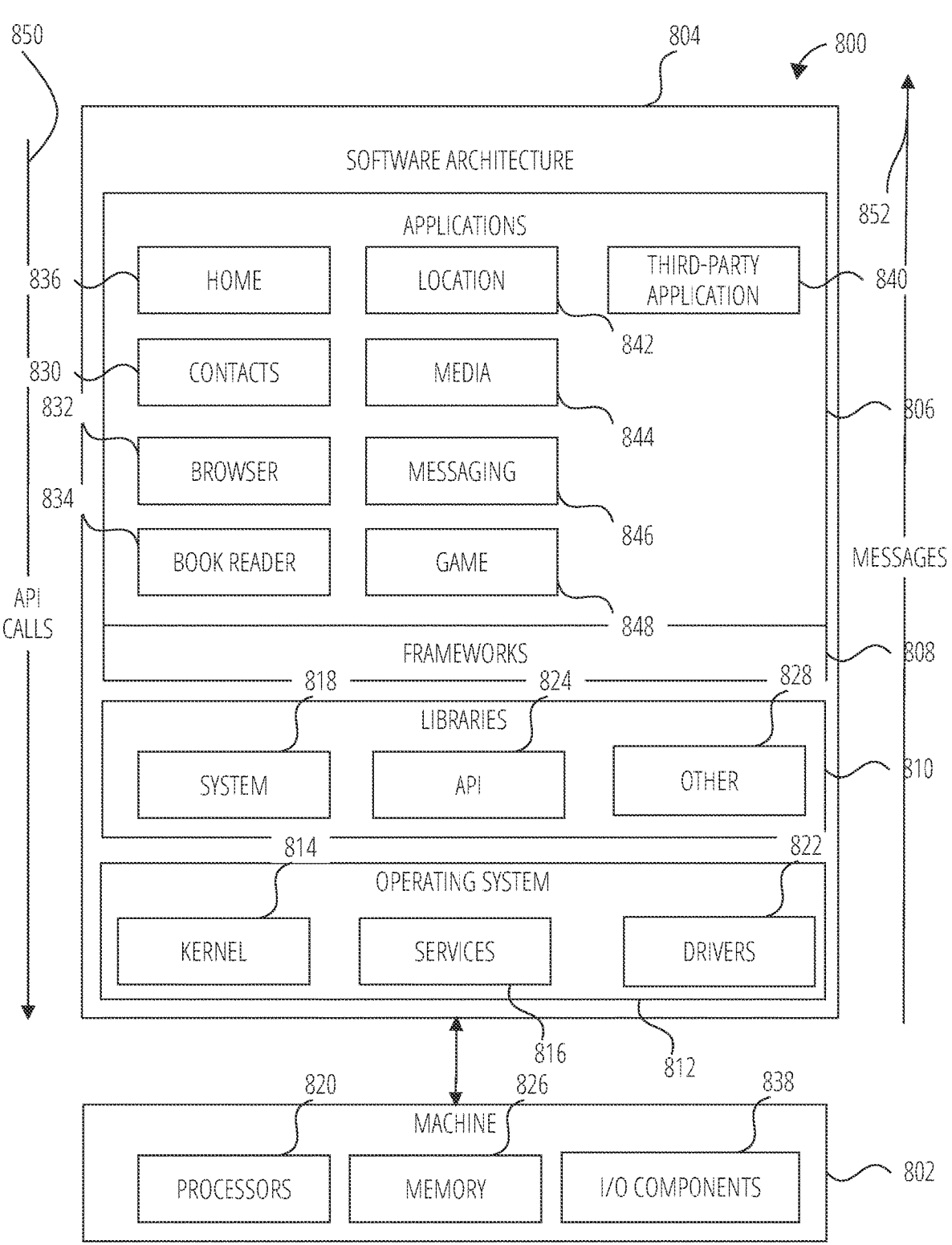
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Processing Components

Figure 9:
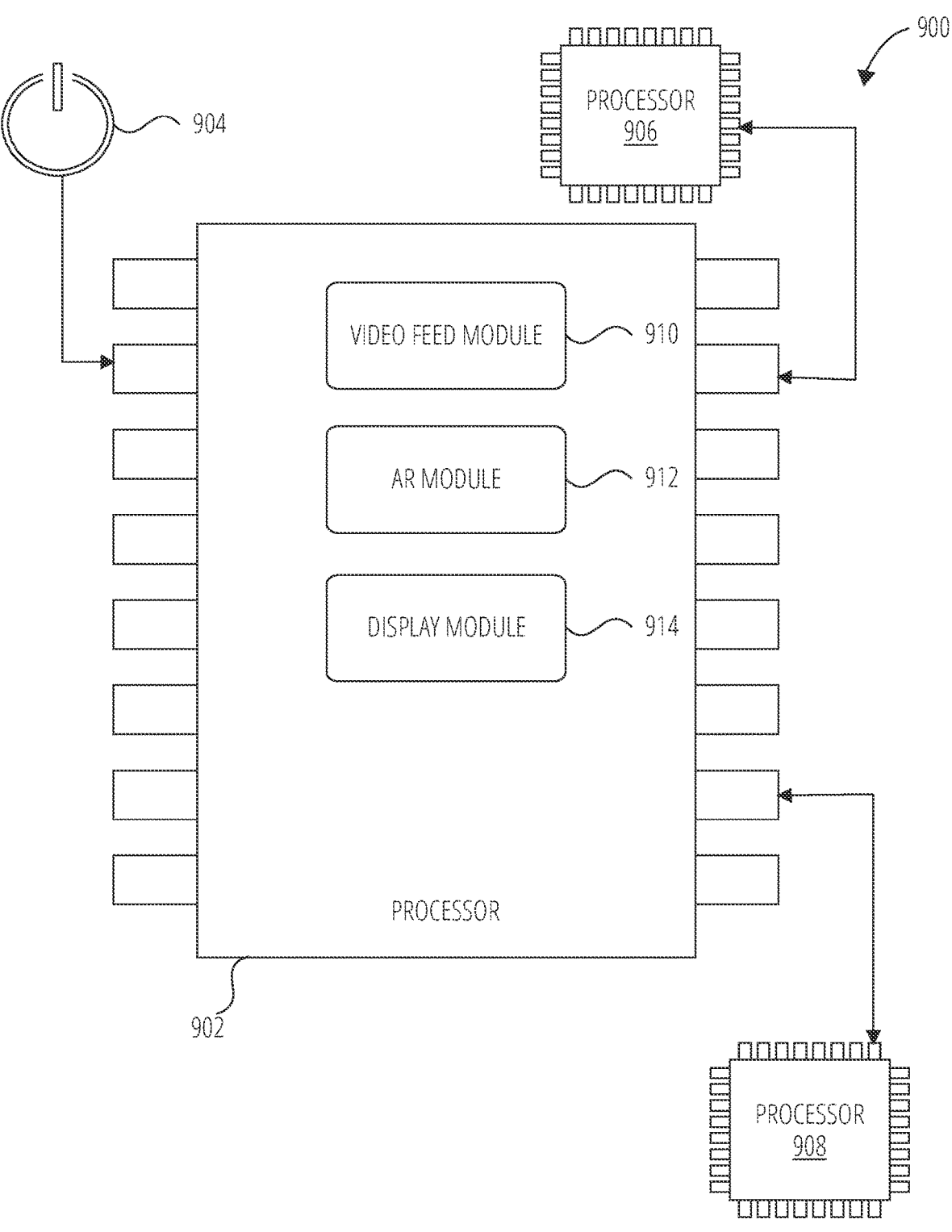
FIG. 9 is a diagrammatic representation of a processing environment, in accordance with some examples.

Turning now to FIG. 9, there is shown a diagrammatic representation of a processing environment 900, which includes a processor 902, a processor 906, and a processor 908 (e.g., a GPU, CPU or combination thereof).

The processor 902 is shown to be coupled to a power source 904, and to include (either permanently configured or temporarily instantiated) modules, namely a video feed module 910, an AR module 912, and a display module 914, operationally configured to perform operations as discussed in the method 300 of FIG. 3, the method 400 of FIG. 4, the method 500 of FIG. 5, and the method 600 of FIG. 6, in accordance with embodiments discussed herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   receiving a live broadcast video feed that comprises a plurality of video frames;
   determining a first video format of the plurality of video frames;
   performing a conversion of each frame of the plurality of video frames from the first video format to a second video format that corresponds with an augmented reality (AR) software development kit (SDK), the conversion includes at least one of downscaling resolution, converting frame rate, or transforming color space;
   detecting depictions of objects within the plurality of video frames;
   presenting a selection of AR effects based on the detected objects;
   receiving a selection of one or more AR effects from the selection of AR effects;
   applying the one or more AR effects of the AR SDK to each of the converted frames among the plurality of video frames;
   re-converting each frame of the plurality of video frames to the first video format; and
   providing the plurality of video frames that include the one or more AR effects to a broadcast video output interface.

2. The method of claim 1, wherein the determining the first video format of the plurality of video frames is based on an attribute of the live broadcast video feed.

3. The method of claim 1, wherein the determining the first video format of the plurality of video frames is based on an input that identifies the first video format.

4. The method of claim 1, wherein the applying the one or more AR effects to each of the converted frames among the plurality of video frames includes:
   receiving an input that selects the one or more AR effects from among a plurality of AR effects.

5. The method of claim 1, wherein the live broadcast video feed input comprises a first frame rate, the AR SDK operates at a second frame rate, and further comprising:

converting the plurality of video frames of the live broadcast video feed from the first frame rate to the second frame rate;

applying the one or more AR effects of the AR SDK to each of the converted plurality of video frames of the live broadcast video feed; and upconverting the converted plurality of video frames that include the one or more AR effects to the first frame rate associated with the live broadcast video feed.

6. A system comprising:

one or more processors; and a memory comprising instructions which, when executed by the one or more processors, cause the one or more processors to perform operations comprising:

receiving a live broadcast video feed that comprises a plurality of video frames;

determining a first video format of the plurality of video frames;

performing a conversion of each frame of the plurality of video frames from the first video format to a second video format that corresponds with an augmented reality (AR) software development kit (SDK), the conversion includes at least one of downscaling resolution, converting frame rate, or transforming color space;

detecting depictions of objects within the plurality of video frames;

presenting a selection of AR effects based on the detected objects;

receiving a selection of one or more AR effects from the selection of AR effects;

applying the one or more AR effects of the AR SDK to each of the converted frames among the plurality of video frames;

re-converting each frame of the plurality of video frames to the first video format; and providing the plurality of video frames that include the one or more AR effects to a broadcast video output interface.

7. The system of claim 6, wherein the determining the first video format of the plurality of video frames is based on an attribute of the live broadcast video feed.

8. The system of claim 6, wherein the determining the first video format of the plurality of video frames is based on an input that identifies the first video format.

9. The system of claim 6, wherein the applying the one or more AR effects to each of the converted frames among the plurality of video frames includes:

receiving an input that selects the one or more AR effects from among a plurality of AR effects.

10. The system of claim 6, wherein the live broadcast video feed input comprises a first frame rate, the AR SDK operates at a second frame rate, and further comprising:

converting the plurality of video frames of the live broadcast video feed from the first frame rate to the second frame rate;

applying the one or more AR effects of the AR SDK to each of the converted plurality of video frames of the live broadcast video feed; and upconverting the converted plurality of video frames that include the one or more AR effects to the first frame rate associated with the live broadcast video feed.

11. A non-transitory machine-readable storage medium comprising instructions that, when executed by one or more processors of a machine, cause the machine to perform operations comprising:

receiving a live broadcast video feed that comprises a plurality of video frames;

determining a first video format of the plurality of video frames;

performing a conversion of each frame of the plurality of video frames from the first video format to a second video format that corresponds with an augmented reality (AR) software development kit (SDK), the conversion includes at least one of downscaling resolution, converting frame rate, or transforming color space;

detecting depictions of objects within the plurality of video frames;

presenting a selection of AR effects based on the detected objects;

receiving a selection of one or more AR effects from the selection of AR effects;

applying the one or more AR effects of the AR SDK to each of the converted frames among the plurality of video frames;

re-converting each frame of the plurality of video frames to the first video format; and providing the plurality of video frames that include the one or more AR effects to a broadcast video output interface.

12. The non-transitory machine-readable storage medium of claim 11, wherein the determining the first video format of the plurality of video frames is based on an attribute of the live broadcast video feed.

13. The non-transitory machine-readable storage medium of claim 12, wherein the determining the first video format of the plurality of video frames is based on an input that identifies the first video format.

14. The non-transitory machine-readable storage medium of claim 11, wherein the applying the one or more AR effects to each of the converted frames among the plurality of video frames includes:

receiving an input that selects the one or more AR effects from among a plurality of AR effects.

* * * * *